United States Patent [19]

Oen

[11] Patent Number: 4,797,792
[45] Date of Patent: Jan. 10, 1989

[54] FORWARD LIGHT HOUSING ASSEMBLY

[75] Inventor: Joshua T. Oen, Castro Valley, Calif.

[73] Assignee: Paccar, Inc., Bellevue, Wash.

[21] Appl. No.: 95,094

[22] Filed: Sep. 9, 1987

[51] Int. Cl.⁴ ............................................. B60Q 1/00
[52] U.S. Cl. ...................................... 362/83; 340/100
[58] Field of Search ..................... 362/83; 340/100, 92

[56]       References Cited
       U.S. PATENT DOCUMENTS

| 176,572 | 1/1956 | Teague | 362/83 |
|---|---|---|---|
| 1,145,087 | 7/1915 | Shaw | 362/83 |
| 2,258,812 | 10/1941 | Ross | 362/83 |
| 4,251,103 | 2/1981 | Nakajima et al. | 362/83 |
| 4,532,578 | 7/1985 | Gaden et al. | 362/83 |
| 4,707,767 | 11/1987 | Bergin et al. | 362/83 |

OTHER PUBLICATIONS

Automotive Engineering, Nov. 1987, front cover.

Primary Examiner—E. Rollins Cross
Attorney, Agent, or Firm—Flehr, Hohbach, Test, Albritton & Herbert

[57]         ABSTRACT

The present invention involves a forward light housing assembly for use on a vehicle, specifically a conventional truck, that enhances the aerodynamic characteristics of the vehicle while eliminating any need to modify the vehicle's body or fenders to properly position its headlights and turn signals. The disclosed light housing assembly incorporates both headlights and a turn signal into a single package that can easily be attached to the leading edge of a fender in a way which blends into the fender's contour, thereby improving the aerodynamic characteristics of the vehicle.

16 Claims, 3 Drawing Sheets

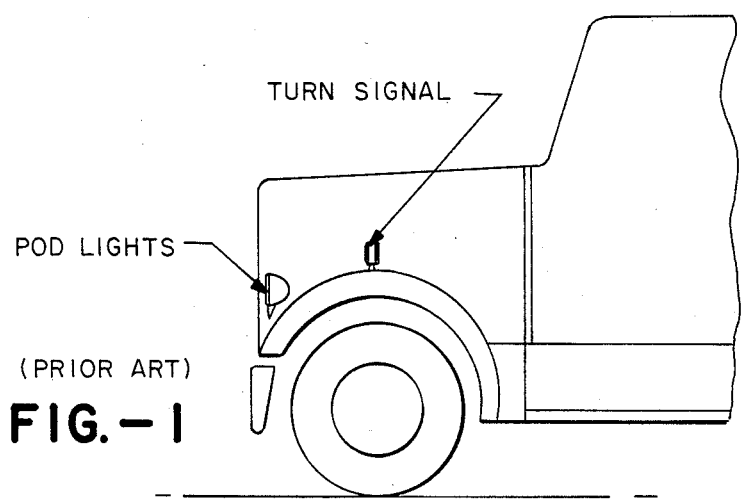
(PRIOR ART)
FIG.—1
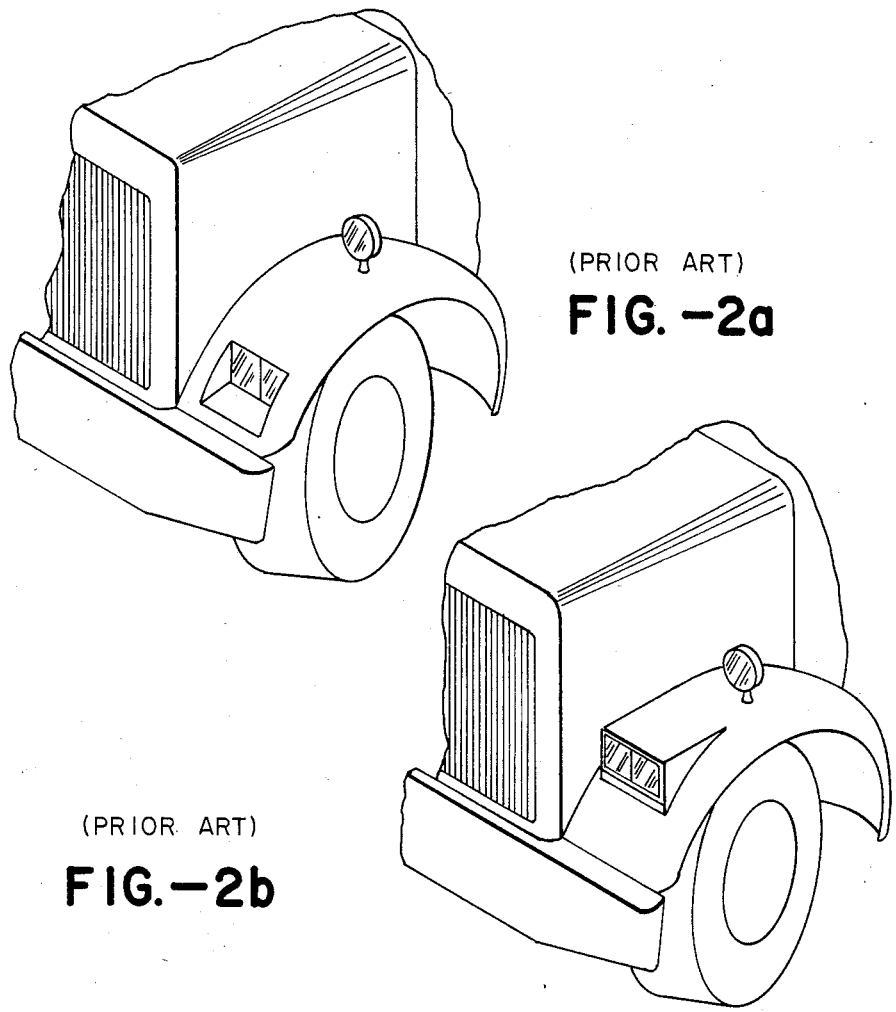
(PRIOR ART)
FIG.—2a
(PRIOR ART)
FIG.—2b

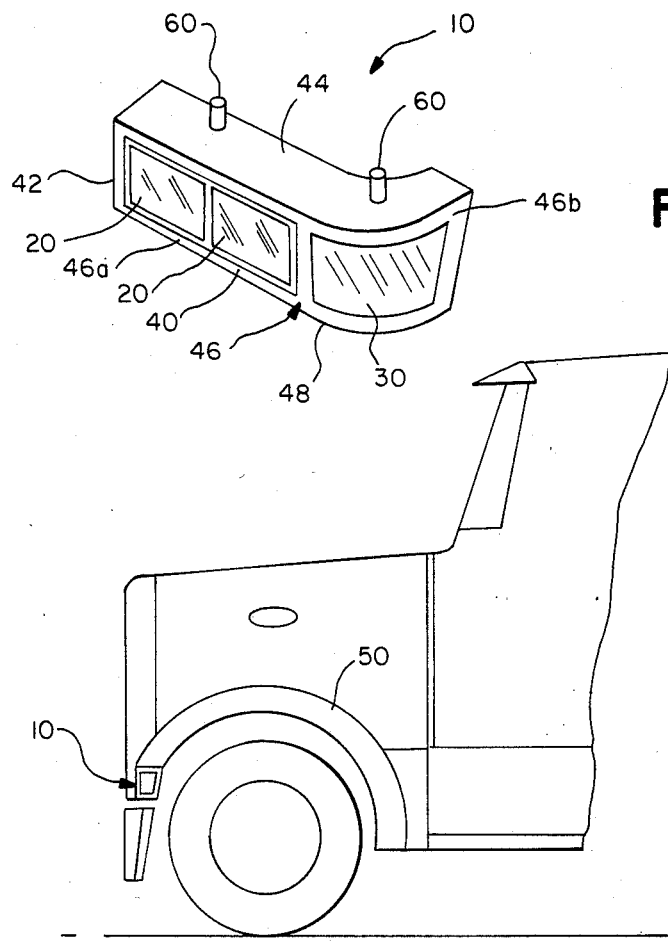
FIG.—3
FIG.—4
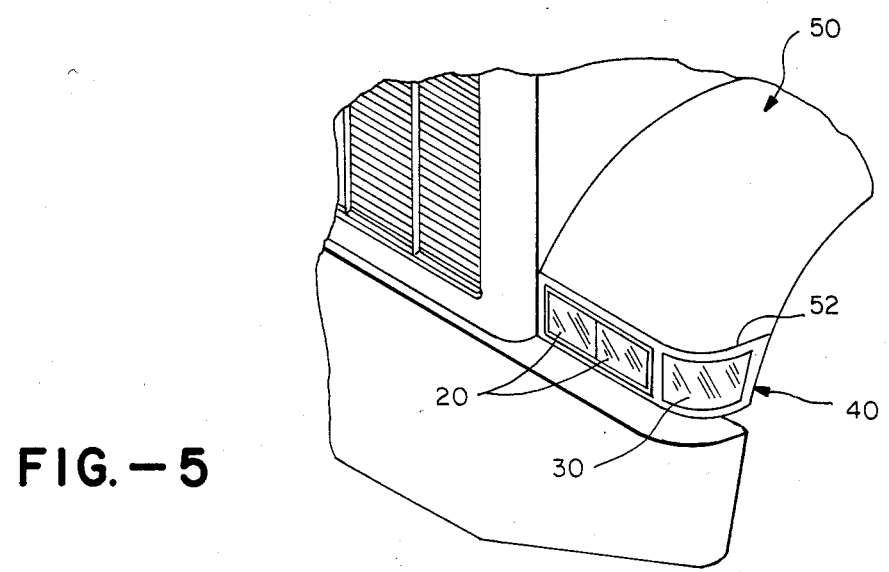
FIG.—5

FORWARD LIGHT HOUSING ASSEMBLY

The present invention relates generally to a light housing for mounting both headlights and turn signals on a vehicle's front fender. More particularly it relates to a housing unit that can be incorporated into the contour of the front fender of a conventional truck.

Historically headlights and turn signals have been incorporated into the design of motor vehicles in order to illuminate directly in front of the vehicle and to indicate to approaching drivers the intentions of the driver. It has long been acknowledged that it is desirable to mount the headlights and turn signals near the sides of the vehicle so that in darkness, approaching drivers will be able to safely judge its exact positions. By mounting the headlights in such a manner the dangers of accidents with oncoming vehicles are greatly reduced. Since the outer-front part of most highway vehicles include their fenders, it is frequently deemed desirable to incorporate both the headlights and turn signals into the fender design. See for example, U.S. Pat. No. 1,145,087.

Conventional trucks have incorporated this concept in a variety of different ways. One popular prior art design, as shown in FIG. 1, incorporates a pod light and a fender mounted turn signal that is attached in lollipop fashion to the top of the fender. Since such lights are typically located on the vehicle's exposed frontal surfaces, they become an important factor in determining the initial air flow over the entire vehicle. A major disadvantage of such designs is that the protruding surfaces of the lights can cause turbulent airflow in their immediate vicinity, which can delay or even eliminate the development of laminar air flow about the vehicle and thereby adversely affect the vehicles aerodynamic characteristics.

Other proposed solutions, as shown in FIG. 2, have included recessing pockets into the fender well to house the headlights (FIG. 2a), or fairing buttresses on top of the fender (FIG. 2b). Even combinations of the two have been used. However these types of solutions have the added disadvantage that they require modifications to the design of the fender.

It is therefore an object of the present invention to provide an approach to the mounting of lights on the front end of conventional trucks, which approach does not have the disadvantages discussed above.

A more specific object of the present invention is to provide a means of mounting headlights and front turn signals to the fenders of a conventional truck without requiring any major modification to the fenders.

A further object of the present invention is to mount the headlights and front turn signal in a manner that will be aerodynamically efficient as well as aesthetically pleasing.

A still further object of the present invention it to provide a light housing that can be attached to the front of a fender in a manner such that it is incorporated into the contour of the fender.

Yet another object of the present invention is to provide a light housing that does not require custom molded headlights and is capable of utilizing standard lighting components.

Still another object of the present invention is to provide a combination headlights/turn signal module which is connected to its electrical source without having to pass electical wiring through the wheel well below its associated fender.

The light housing assembly disclosed incorporates both a headlight and a turn signal into a single housing which can be mounted to the leading edge of a conventional truck fender. In a preferred embodiment, the front light housing has the same width and thickness as the fender to which it is mounted. The shape of the housing is essentially flat on its interior and upper sides allowing it to respectively fit flushly against the body of the truck and the leading edge of a fender. The exterior side of the housing is preferably styled to match the contour of the fender.

The advantages of the light housing assembly just described are numerous. First, because the lights fit smoothly into the fender's contour, the aerodynamic characteristics of the vehicle are enhanced since laminar air flow can more easily form around smooth surfaces than protruding surfaces. Second, by blending the headlights and the turn signals into the body lines the design becomes aesthetically cleaner. Third, since the light housing unit is attached to the leading edge of a fender, modifications to the fender design, such as recesses and cutouts are eliminated. Additionally, the housing unit may utilize standard lighting components eliminating the need for custom molding.

Further, all of the electrical wiring for connecting both the headlights and turn signals can be routed to its power supply aboard the vehicle directly through the engine compartment without having to pass through the wheel well below the fender. This is to be contrasted with those prior art arrangement where the wiring is located within the wheel well. In those cases, there tends to be damage to the wiring due to terminal corrosion and abrasion to the wiring due to flying debris. Also, moisture tends to leak into the module along the wiring and mud and snow tends to build up on the wiring harness.

Still other objects and features of the present invention will be apparent from the following detailed description in conjunction with the accompanying drawings, wherein:

FIGS. 1, 2a and 2b are perspective views of prior art methods of mounting turn signals and headlights to conventional truck fenders.

FIG. 3 is a perspective view of a light housing assembly designed in accordance with the present invention.

FIG. 4 is a side elevation of a conventional truck incorporating a light housing assembly designed in accordance with the present invention.

FIG. 5 is a perspective view of a light housing assembly incorporated into the fender of a conventional truck fender in accordance with the present invention.

Figure 6:
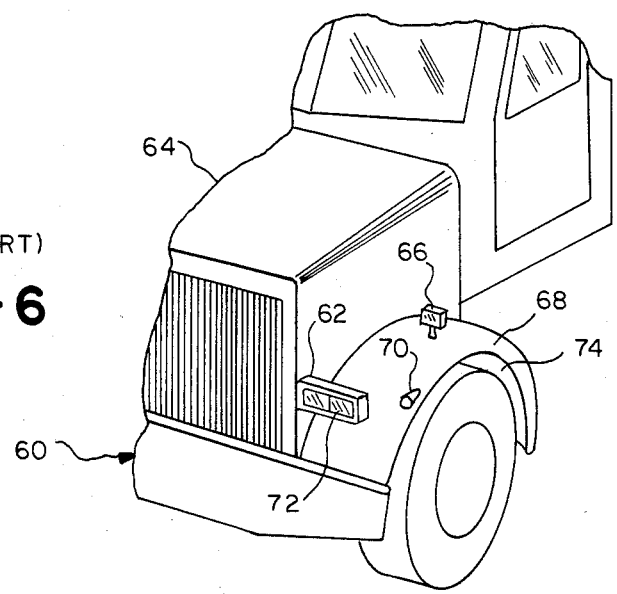
FIG. 6 is a perspective view of another prior art method of mounting headlights and turn signals to and adjacent to a conventional truck fender.

Turning now to the drawings, wherein like components are designated by like reference numerals throughout the various figures, attention is first directed to FIG. 3 which illustrates a front light housing assembly 10 designed in accordance with the present invention. The front light housing assembly 10 includes at least one headlight 20 and a turn signal 30. The headlights 20 and the turn signal 30 are encased within a light housing module 40. The light housing module 40 has an interior side 42, a top side 44, an exterior side 46 divided into a front section 46a that includs the headlights and a side section 46b which includes the turn signal. Two bolts 60 extend from the top side 44 to accommodate attachment to the fender. The interior side 42 is defined as the side nearest the center of vehicle's front face. It is contemplated that the light housing module will be manufactured as a separate unit. FIGS. 3, 4 and 5 incorporate two separate headlamps into the light housing module allowing for separate high and low beams. However it is contemplated that a single headlight could be used to perform both functions.

Referring now to FIGS. 4 and 5, light housing module 40 is mounted to the fender 50 of a conventional truck 9. The mounting can be accomplished through any suitable nonobstructive attaching means. A nonobstructive attaching means is one which does not interfere with airflow about the truck. In a preferred embodiment, a sheet metal flaring (not shown) is attached to the underside of fender 50. Bolts 60 (as seen in FIG. 3) extend through the flaring and standard nuts can be employed to secure the light housing assembly 10 to the fender 50. The top side 44 of the light housing module 40 matches the contour of fender 50 and fits snugly against the flaring. Thus, only the flatness of the headlights diminishes the appearance of the light housing module as an extension of the fender. Preferably light housing module 40 is the same width as fender 50; interior side 42 fits tightly against the trucks body; and exterior side 46 may be tapered, as shown in FIG. 4 so that it neatly blends the fender to the bumper.

The nonobstructive means of attaching the light housing assembly 10 to the fender 50 in accordance with the present invention has the advantage of not requiring any substantial modification to the design of fender 50. To accommodate attachment of the light housing assembly, the typical truck fender need only be rotated slightly clockwise (as viewed from FIG. 4) or slightly shortened near its leading edge, thereby placing the leading edge of the fender at a point slightly higher than it would normally be found. Thus the present invention eliminated the need for such fender modifications as recessed pockets or faired-in buttresses.

From the foregoing, it should be apparent that the present invention is aerodynamically efficient since it does include projections that extend out of the fenders contour. Eliminating protrusions from the exposed frontal end of the truck, reduces the likelihood that turbulent airflow will develop around the vehicle. In addition since the overall housing assembly 10 extends the entire width of fender 50, the wiring connected to its headlights and turn signals can be routed to the trucks power supply (e.g., battery) without having to pass into the wheel well under the fender. Rather, these wires can be routed from within module 40 through a cooperating opening (not shown) in interior side 42 and directly through the engine compartment of the truck.

While the light housing assembly just described is preferred, it is to be understood that the present invention is not limited to the specific features described. For example, the light housing assembly may include only one headlight or more than two headlights. Additionally, other elements such as foglights or spotlights may be incorporated into the light housing assembly. Further, the present invention is not limited to the geometry of the light housing assembly as discussed. Rather, the exterior edge 46 of the light housing module 40 is contemplated to be flat, rounded or otherwise configured so as to present a smooth transition from fender 50. Similarly, the top side 44 is contemplated to be any shape necessary to blend smoothly with the leading edge of the fender. Likewise, both the interior side 42 and the bottom side 48 of the light housing assembly 10 may be formed in any shape that accents the appearance of the truck 9.

Figure 7:
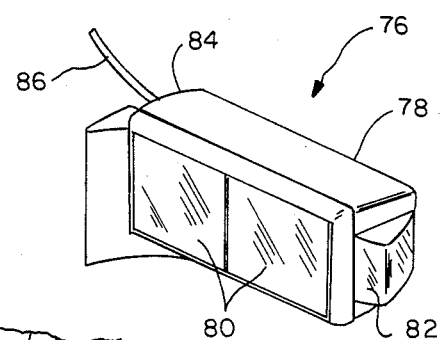
FIG. 7 is a perspective view of a light housing assembly designed in accordance with a second embodiment of the present invention.
Figure 8:
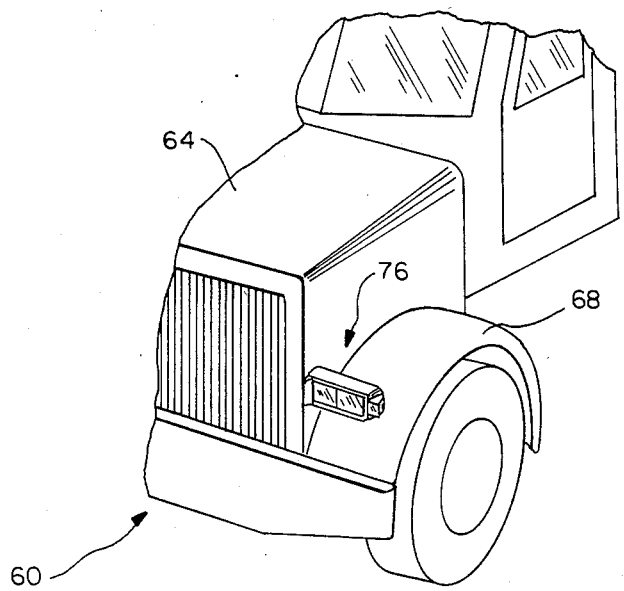
FIG. 8 is a perspective view of a conventional truck incorporating the assembly of FIG. 7.

Having described front light housing assembly 10, attention is now directed to FIGS. 6, 7 and 8. FIG. 6 illustrates a conventional truck 60 including a front headlight module 62 mounted directly to the side section of the trucks hood 64, a turn signal 66 mounted directly on top of the trucks fender 68, and a marker light 70 also mounted directly to fender 68. While the electrical wiring associated with the headlights 72 forming part of headlight module 62 may be routed directly to the vehicles battery or other such power supply through the engine compartment under hood 64, that is not the case with respect to turn signal 66 and marker light 70. The electrical wiring associated with each of these components is first routed through the wheel well 74 under fender 68 before passing into and through the engine compartment. Routing wires in this way is a major cause of lighting related failures. More specifically, because of the rather harsh environment within the wheel well the wiring terminals tend to corrode and flying debris results in abrasion to the wirings. Also, there is a tendency for water to permeate through the wires and into the lighting components within the turn signal module and/or marker light module.

By incorporating the turn signal with the headlight into a single module, as in the case of assembly 10, wiring through the wheel well can be eliminated. In the particular case of assembly 10, because of its physical location across the entire width of its associated fender, it also serves as a marker light, thereby eliminating a separate marker light on the fender and thus eliminating further wiring through the wheel well as in the arrangement illustrated in FIG. 6.

Turning now to FIG. 7, a light housing assembly 76 designed in accordance with a second embodiment of the present invention is illustrated. This assembly includes an overall housing module 78 which contains two headlights 80 and a combination turn signal and marker light generally indicated at 82. The two headlights define the front or forwardmost face of the housing module while a combination turn signal and marker light defines the modules outermost end. The innermost end of the module, generally indicated at 84 is provided with suitable means (not shown) for mounting the entire module to the side wall of previously described fender 64 forming part of conventional truck 60. Note that the fender 68 in FIG. 8 does not include a turn signal or marker light. Also note that the overall housing assembly 76 is mounted directly to the side panel of fender 64.

Returning to FIG. 7, it can be seen that the electrical wiring associated with the headlights and combination turn signal and marker lights, as generally indicated at 86, extends out inner side 84. This wiring is routed to the vehicles power supply directly through a cooperating opening in the side section of fender 64 and from there into and through the engine compartment. In other words, none of the wiring passes into and through the wheel well 74.

While overall assembly 76 is shown including two headlights and a combination turn signal and marker light, it is to be understood that a single headlight or more than two headlights could be provided. Moreover, if the assembly is sufficiently long (widthwise) so as to extend the entire width of its associated fender, it would not necessarily have to include a marker light, as the headlight could function as the marker light. Also, under normal circumstances, an assembly 76 would be provided on each side of the vehicle's hood.

Having described front light housing assembly 10, attention is now directed to FIGS. 6, 7 and 8. FIG. 6 illustrates a conventional truck 60 including a front head light module 62 mounted directly to the side section of the truck's hood 64, a turn signal 66 mounted directly on top of the trucks fender 68, and a marker light 70 also mounted directly to fender 68. While the electrical wiring associated with the headlights 72 forming part of headlight module 62 may be routed directly to the vehicle's battery or other such power supply through the engine compartment under hood 64, that is not the case with respect to turn signal 66 and marker light 70. The electrical wiring associated with each of these components is first routed through the wheel well 74 under fender 68 before passing into and through the engine compartment. Routing wires in this way is a major cause of lighting related failures. More specifically, because of the rather harsh environment within the wheel well, the wiring terminals tend to corrode and flying debris results in abrasion to the wiring. Also, as indicated previously, there is a tendency for water to permeate through the wires and into the lighting components within the turn signal module and/or marker light module.

By incorporating the turn signal with the headlight into a single module, as in the case of assembly 10, wiring through the wheel well can be eliminated. In the particular case of assembly 10, because of its physical location across the entire width of its associated fender, it also serves as a marker light, thereby eliminating a separate marker light on the fender and thus eliminating further wiring through the wheel well as in the arrangement illustrated in FIG. 6.

Turning now to FIG. 7, a light housing assembly 76 designed in accordance with a second embodiment of the present invention is illustrated. This assembly includes an overall housing module 78 which contains two head lights 80 and a combination turn signal and marker light generally indicated at 82. The two headlights define the front or forwardmost face of the housing module while a combination turn signal and marker light defines the modules outermost end. The inner most end of the module, generally indicated at 84 is provided with suitable means (not shown) for mounting the entire module to the side wall of previously described fender 64 forming part of coventional truck 60. Note that the fender 68 in FIG. 8 does not include a turn signal or marker light. Also note that the overall housing assembly 76 is mounted directly to the side panel of fender 64.

Returning to FIG. 7, it can be seen that the electrical wiring associated with the headlights and combination turn signal and marker lights, as generally indicated at 86 extends out inner side 84. This wiring is routed to the vehicle's power supply directly through a cooperating opening in the side section of fender 64 and from there into and through the engine compartment. In other words, none of the wiring passes into and through the wheel well 74.

While overall assembly 76 is shown including two headlights and a combination turn signal and marker light, it is to be understood that a single headlight or more than two headlights could be provided. Moreover, if the assembly is sufficiently long (widthwise) so as to extend the entire width of its associated fender, it would not necessarily have to include a marker light, as the headlight could function as the marker light.

What is claimed is:

1. A fender arrangement forming part of a motorized vehicle, comprising:
   (a) a front fender having a forwardmost end;
   (b) a light assembly separate from but adapted for attachment to the front end of said fender so as to form an extension thereof, said assembly including:
      (i) at least one headlight,
      (ii) a turn signal,
      (iii) a light housing module for containing said headlight and said turn signal; and
   (c) means for attaching said light housing to the front end of said fender whereby the light assembly is incorporated into the contour of the fender.

2. The arrangement recited in claim 1 wherein said attaching means appends the top side of said light housing module flushly against the leading edge of the fender and is nonobstructive to the airflow about the vehicle.

3. The arrangement recited in claim 2 wherein said light housing module is the same thickness and the same width as the fender that it is attached to.

4. An arrangement according to claim 1 wherein said light assembly includes electrical wiring for connecting said headlight and turn signal to a source of power within said vehicle, said wiring being routed to said power source without passing through the wheel well located below said fender.

5. A method of incorporating a headlight and turn signal in the front fender of a conventional truck comprising the steps of providing a light assembly including a light housing module containing a headlight and a turning signal and attaching the forward light assembly directly to the leading edge of the fender in a nonobstructive manner that incorporates said forward light assembly into the fender contour.

6. In a conventional truck, a fender arrangement that includes a front fender, a first headlight and a turn signal, the improvement comprising:
   (a) a light housing module that encases said first headlight and said turn signal; and
   (b) means of attaching said light housing module to the fender in a manner that nonobstructively incorporates said light housing module into the fender's contour and does not require substantial modification of the fender's design.

7. The arrangement as recited in claim 6 wherein said attaching means connects the leading edge of the front fender to a top of said light housing module.

8. The arrangement as described in claim 7 further comprising a foglight that is encased in said light housing module.

9. The arrangement as described in claim 7 further comprising a second headlight that is encased in said light housing module.

10. The arrangement as described in claim 7 wherein said light housing module is the same thickness and the same width as said fender.

11. In a motorized vehicle having a front engine section including a hood having a top segment and opposite side segments and opposite fenders located above the vehicles front wheels and, with the wheels, defining wheel wells below the fenders, the improvement comprising a pair of light assemblies mounted directly to the side segments of the vehicle's hood directly above the front ends of said fenders, each of said light assemblies including at least one headlight, a turn signal and electrical wiring for connecting said headlight and turn signal to a source of power carried by said vehicle, said wiring extending from said assembly to said power supply without passing through its associated wheel well.

12. The improvement according to claim 11 wherein each of said assemblies includes a combination turn signal and marking light which serves not only as said turn signal but also as a marker light.

13. A light assembly forming part of a motorized vehicle, said assembly comprising a modular housing; at least one headlight disposed within said housing and a combination turn signal and marker light also disposed within said housing.

14. In a motorized vehicle having a front engine section including a hood having a top segment and opposite side segments and opposite fenders located above the vehicles front wheels and, with the wheels, defining wheel wells below the fenders, the improvement comprising a pair of light assemblies mounted directly to the side segments of the vehicles hood directly above the front ends of said fenders, each of said light assemblies including at least one headlight, a turn signal and electrical wiring for connecting said headlight and turn signal to a source of power carried by said vehicle, said wiring extending from said assembly to said power supply without passing through its associated wheel well.

15. The improvement according to claim 14 wherein said assembly includes a combination turn signal and marking light which serves not only as said turn signal but also as a marker light.

16. A light assembly forming part of a motorized vehicle, said assembly comprising a modular housing; at least one headlight disposes within said housing and a combination turn signal and marker light also disposed within said housing.

* * * * *